United States Patent [19]

Kline et al.

[11] Patent Number: 5,134,428
[45] Date of Patent: Jul. 28, 1992

[54] DRIVE CIRCUITS FOR SPARK-DISCHARGE IMAGING APPARATUS

[75] Inventors: John F. Kline, Londonderry; Keith V. Robb, Wilton, both of N.H.

[73] Assignee: Presstek, Inc., Hudson, N.H.

[21] Appl. No.: 640,966

[22] Filed: Jan. 14, 1991

Related U.S. Application Data

[60] Continuation-in-part of Ser. No. 413,172, Sep. 27, 1989, Pat. No. 5,005,479, which is a division of Ser. No. 234,475, Aug. 19, 1988, Pat. No. 4,911,075.

[51] Int. Cl.$^5$ .......................................... G01D 15/08
[52] U.S. Cl. .................................................. 346/163
[58] Field of Search ................................ 346/162-164

[56] References Cited

U.S. PATENT DOCUMENTS

| | | | |
|---|---|---|---|
| 3,504,154 | 3/1970 | Marcolini . | |
| 4,021,605 | 5/1977 | Tauszig | 346/163 X |
| 4,415,912 | 11/1983 | Kudelski et al. | 346/163 X |
| 4,566,019 | 1/1986 | Goldrian et al. | 346/163 |

*Primary Examiner*—George H. Miller, Jr.
*Attorney, Agent, or Firm*—Cesari and McKenna

[57] ABSTRACT

Electrode-driver circuits for use with non-contact spark-discharge imaging systems. The circuits rapidly produce short-duration, high-voltage pulses that cause the discharge of a spark to the surface of a printing plate; they feature short rise times, rapid operation and clean decays, thereby facilitating high-speed spark-discharge imaging.

9 Claims, 14 Drawing Sheets

OUTPUT CIRCUIT CHARGE FOR NEGATIVE OUTPUT VOLTAGE PULSE ONLY

DRIVE CIRCUITS FOR SPARK-DISCHARGE IMAGING APPARATUS

RELATED APPLICATION

This is a continuation-in-part of Ser. No. 07/413,172 filed Sep. 27, 1989, now U.S. Pat. No. 5,005,479 (the entire contents of which are hereby incorporated by reference), which is itself a division of Ser. No. 07/234,475, filed Aug. 19, 1988, now U.S. Pat. No. 4,911,075.

BACKGROUND OF THE INVENTION

A. Field of the Invention

The invention relates generally to the field of imaging devices and, more specifically, to driver circuitry for digitally operated imaging devices.

B. Discussion of the Prior Art

Traditional techniques of introducing a printed image onto a recording material include letterpress printing, gravure printing and offset lithography. All of these printing methods require a plate, usually loaded onto a plate cylinder of a rotary press for efficiency, to transfer ink in the pattern of the image. In letterpress printing, the image pattern is represented on the plate in the form of raised areas that accept ink and transfer it onto the recording medium by impression. Gravure printing plates, in contrast, contain series of wells or indentations that accept ink for deposit onto the recording medium; excess ink must be removed from the surface of the plate by a doctor blade or similar device prior to contact between the plate and the recording medium.

In the case of offset lithography, the image is present on a plate or mat as a pattern of ink-accepting (oleophilic) and ink-repellent (oleophobic) surface areas. In a dry lithographic printing system, the plate is simply inked and the image transferred onto a recording material; usually, the plate first makes contact with a relatively soft intermediate surface called a blanket cylinder which, in turn, applies the image to the paper or other copying medium. In typical rotary press systems, the recording medium is pinned to an impression cylinder, which brings it into contact with the blanket cylinder.

In a wet lithographic printing system, the non-image areas are hydrophilic, and the necessary ink-repellency is provided by an initial application of a dampening (or "fountain") solution to the plate prior to inking. The fountain solution prevents ink from adhering to the non-image areas, but does not affect the oleophilic character of the image areas.

The plates for an offset press are usually produced photographically. In a typical negative-working subtractive process, the original document is photographed to produce a photographic negative. This negative is placed on an aluminum plate having a water-receptive oxide surface coated with a photopolymer. Upon exposure to light or other radiation through the negative, the areas of the coating that received radiation (corresponding to the dark or printed areas of the original) cure to a durable oleophilic state. The plate is then subjected to a developing process that removes the uncured areas of the coating (i.e., those which did not receive radiation, corresponding to the non-image or background areas of the original), and these non-cured areas become oleophobic and/or hydrophilic.

A number of difficulties attend both the platemaking and ink-transfer stages of printing. The photographic process used to produce conventional plates is time-consuming and requires a facility and equipment adequate to support the necessary chemistry. To circumvent this process, practitioners have developed a number of electronic alternatives to plate imaging, some of which can be utilized on-press. With these systems, digitally controlled devices alter the ink-receptivity of blank plates in patterns representative of the images to be printed. Such imaging devices include sources of electromagnetic-radiation pulses, produced by one or more laser or non-laser sources, that create chemical changes on plate blanks (thereby eliminating the need for a photographic negative); ink-jet equipment that directly deposits ink-repellent or ink-accepting spots on plate blanks; and spark-discharge equipment, in which an electrode in contact with or spaced close to a plate blank produces electrical sparks to physically alter the topology of the plate blank, thereby producing "dots" which collectively form a desired image.

Two classes of spark-discharge imaging equipment are currently in use. Both are amenable to digital control. In the older version of the technology, often referred to as "electroerosion", a stylus electrode is in constant contact with the surface of a plate blank. Suitable plate blanks include an oleophilic, or ink-accepting, plastic substrate (e.g., Mylar plastic film), a thin coating of aluminum thereover, and an overcoating containing conductive particles (e.g., graphite) that act as a lubricant to reduce scratching of the aluminum by the stylus; see, e.g., U.S. Pat. No. 4,596,733.

The electroerosion stylus is caused to move across the surface and receives relatively low-voltage electrical pulses in accordance with incoming picture signals. The resultant current flow between the stylus and the plate is, by design, sufficient to erode away the thin aluminum layer and the overlying lubrication coating, thereby exposing the underlying oleophilic layer. The pattern of applied pulses corresponds to the printed portions of the document. After the image is applied to the plate blank in this manner, the remaining coating is washed away, leaving the imaged plate with a pattern of hydrophilic (non-image) metal areas and oleophilic (image) areas.

This method of making lithographic plates is disadvantaged in that the electroerosion process works only on plates whose conductive surface coatings are very thin, resulting in somewhat fragile plates capable of a relatively small number of production runs. Furthermore, contact between the stylus and the surface of the plate frequently produces scratches that degrade the final image, because the scratches produce inadvertent or unwanted image areas on the plate which, in turn, print unwanted marks on the final copies. Again because of the contact between stylus and plate, the electroerosion process tends to be rather slow.

The second type of spark-discharge imaging equipment relies on electric arcs or plasma-jet discharges to ablate one or more surface layers of a lithographic plate blank to produce a similar pattern of oleophilic and oleophobic (or hydrophilic) layers. As in electroerosion systems, the discharge devices scan the plate blanks in accordance with digital picture signals to produce the necessary plate topologies. Suitable apparatus for performing this type of imaging are described in U.S. Pat. No. 4,911,075 (commonly owned with the present application and hereby incorporated by reference), allowed application Ser. No. 07/554,089 (commonly owned with the present application and hereby incorporated by reference), and a PCT application filed in the U.S. Patent and Trademark Office on Sep. 28, 1990 entitled "Plasma-Jet Imaging Apparatus and Method" and assigned serial no. US90/05546 (also commonly owned with the present application and hereby incorporated by reference). Hereafter, the term "spark discharge" will be used to refer both to production of electrical arcs and plasma-jet discharges.

Suitable plate constructions, designed for use with the latter type of imaging equipment, are described in U.S. Pat. No. 4,911,075 and U.S. application Ser. Nos. 07/442,317 and 07/410,295. These plates contain, at a minimum, a conductive metal layer of greater thickness than that used in electroerosion, and a second layer underlying the metal layer, the metal and underlying layers having different affinities for ink and/or water. Because of the thickness of the metal layer, the spark discharges must be more powerful than those associated with electroerosion.

Use of a relatively thick metal imaging layer confers two key advantages. The first is high imaging accuracy. In a non-contact imaging system, reproduction accuracy depends on the ability to prevent the discharge from wandering as it travels from its source to the surface of the plate. This ordinarily requires a high field gradient between the discharge source and the point on the plate that is to be imaged. The strongest part of the field on the plate, to which the discharge is most strongly attracted, occurs at the point precisely opposite the discharge source. However, the strength of the field at this point must be sufficiently greater than the strength at any other point to overcome the inherently random nature of the discharge. The stronger the gradient, the faster the field strength will diminish as the path from source to plate deviates from the normal. Accordingly, high output voltage creates a strong gradient, which in turn favors straight-line discharge travel by emphasizing the recession of the plate field strength in all directions away from the normal.

Second, high-energy discharges permit use of refractory materials in the plates. By employing strong surface and substrate layers, it is possible to produce lithographic plates that offer longer performance lifetimes than those of the prior art.

To exploit the capabilities of non-contact spark-discharge equipment, it is necessary to provide support circuitry capable of satisfying a number of demanding and potentially conflicting criteria. Because one advantage of non-contact systems is the possibility of high imaging speed facilitated by lack of contact between the imaging devices and the plate surface, the driver circuitry should switch rapidly in order to take advantage of this feature. In addition, because of the high voltage levels necessary to cause metal ablation and straight-line spark travel, the delivered pulses must have an extremely fast rise time. They should also decay very rapidly after they are applied to prevent unintended additional discharges. Finally, because the size of an image spot depends primarily on the applied discharge energy, the pulse width (and, preferably, the amplitude) should be controllable and relatively precise.

DESCRIPTION OF THE INVENTION

A. Brief Summary of the Invention

The present invention provides novel electrode-driver circuits which, in response to imaging data and a control signal, rapidly produce short-duration high-voltage pulses that cause the discharge of a spark to the surface of a printing plate. These circuits all feature short rise times, rapid operation, controllable pulse widths and clean decays, thereby facilitating high-speed spark-discharge imaging.

They also avoid excessive ringing or high steady-state output voltages that would inadvertently cause discharges or unduly sustain those produced deliberately. All designs described herein utilize MOSFET elements as high-voltage switching devices. Preferred applications of each design are described in the ensuing discussion.

B. Brief Description of the Drawings

The foregoing discussion will be understood more readily from the following detailed description of the invention, when taken in conjunction with the accompanying drawings, in which.

C. Detailed Description of the Invention

Figure 1:
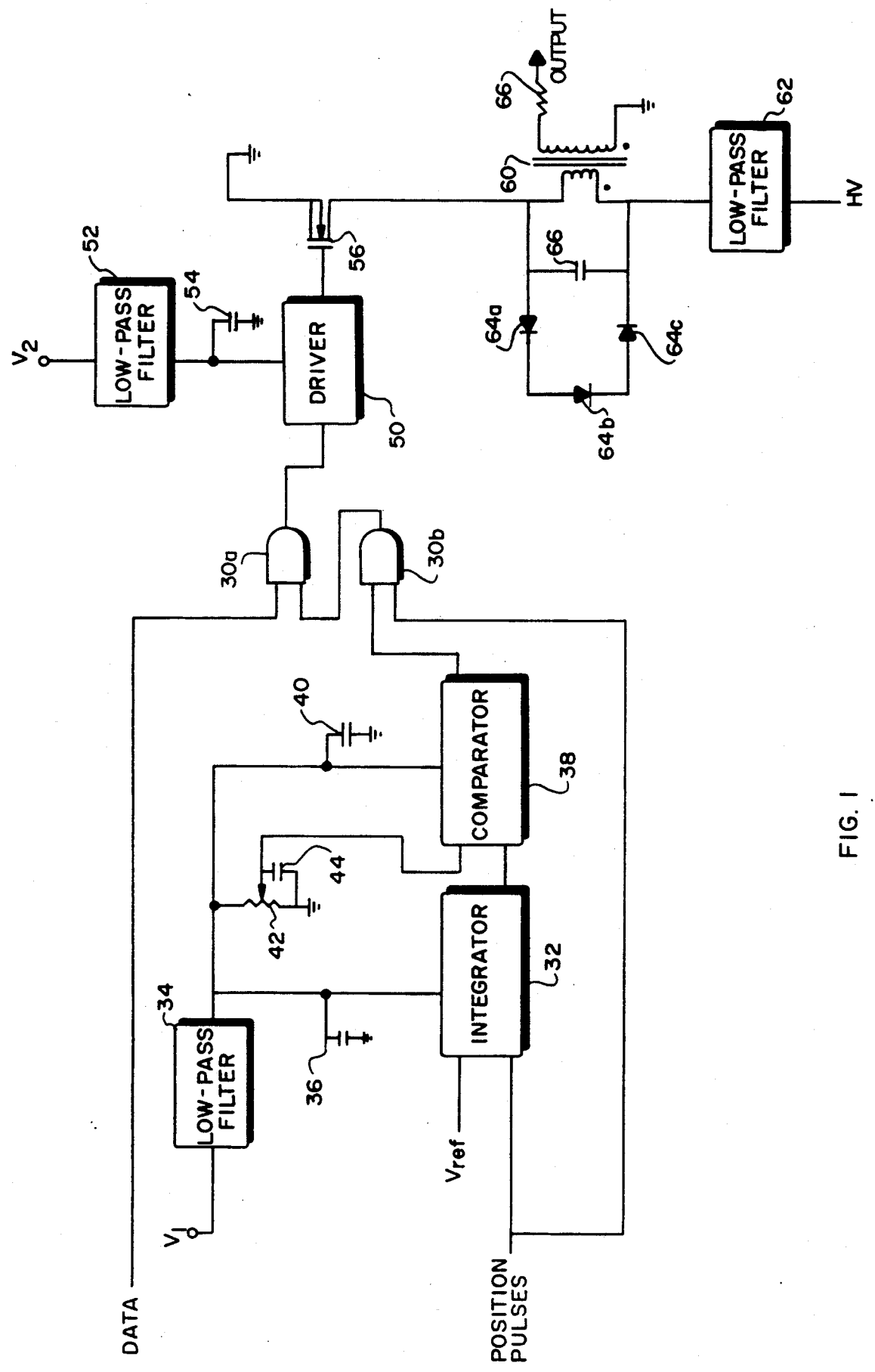
FIG. 1 is a schematic of the first embodiment of the invention, which permits direct adjustment of output amplitude.

Refer first to FIG. 1, which is a schematic depiction of the first embodiment of the invention. This version utilizes an integrator and a comparator to create a triggering pulse of variable width, which facilitates direct adjustment of the amplitude of the output pulse. The circuit provides an output voltage in the range of $-2,000$ to $-5,000$ volts, which is delivered to an electrode positioned adjacent the plate blank to be imaged (the electrode is shown simply as "OUTPUT" in the figure for clarity). As inputs, the circuit receives streams of data signals and position pulses; these will now be described.

The position pulses are control signals provided by the controller of the imaging apparatus, and are asserted each time the electrode passes over an eligible location on the surface of the printing plate where an image spot may be either burned or left blank. Suitable control circuitry for providing these position pulses is described in a copending application entitled "CONTROLLER FOR SPARK-DISCHARGE IMAGING", filed contemporaneously herewith and designated by attorney docket no. 15353-28; the entire disclosure of that application is hereby incorporated by reference herein. Essentially, the control circuitry represents the plate surface as a grid of eligible spot locations, the dimensions of the grid being determined at least in part by the manner in which the document to be printed was "screened" (that is, digitized into cellular form). Image spots may be applied only on plate locations corresponding to points of the grid; all plate areas not on the grid, as well as eligible locations that will not be imaged, do not receive spark discharges. The control circuitry monitors the relative physical locations of the imaging electrode and the plate surface, relating these physical locations to the digitally stored grid.

The stream of data signals, which collectively represent the document or picture to be printed, determines which of the eligible plate locations ar to receive discharges and which are to be left blank. Accordingly, a spark discharge applied only when both the data signal and the position pulse are asserted.

In the circuit, two AND gates, 30a and 30b, receive as inputs a stream of data signals and position pulses, respectively. The position pulses are also applied to one input terminal of an integrator 32. The other input terminal of integrator 32 is connected to a suitable d.c. reference voltage, shown in the figure as $V_{ref}$, which provides a threshold for switching. Integrator 32 is powered by a suitable power supply connected at point $V_1$, preferably connected by way of a low-pass filter 34 and a bypass capacitor 36. The design of FIG. 1 includes several such filters and stabilizers to isolate the device from the electrically noisy environment in which it is to operate; these will be described in the ensuing discussion. For ease of presentation, similar components have been omitted from the remaining figures, it being understood that the desirability and mode of their inclusion would be a straightforward matter for one skilled in the art.

The output terminal of integrator 32 is connected to one input terminal of a high-speed comparator 38, which also receives power from $V_1$ by way of low-pass filter 34 and a bypass capacitor 40. The other input terminal of comparator 38 is connected to an adjustable reference voltage produced by feeding $V_1$ (via low-pass filter 34) through a potentiometer 42, with a bypass capacitor 44 connected as shown. Accordingly, the signal provided by integrator 32 is compared by comparator 38 against the adjustable reference voltage.

The output terminal of comparator 38 is connected to an input terminal of AND gate 30b which, it will be recalled, also receives the stream of position pulses at its other input terminal. The output of AND gate 30b provides the other input to AND gate 30a, and the output terminal of this latter gate is connected to the input terminal of a high-speed, high-current MOSFET driver 50. Driver 50 receives power from a suitable power source, connected at point $V_2$, via a low-pass filter 52 and a bypass capacitor 54. The output terminal of driver 50 is connected to the gate of a MOSFET 56; because driver 50 is capable of supplying a high output current to quickly charge the MOSFET gate capacitance, the turn-on and turn-off times for MOSFET 56 are very short. The source terminal of MOSFET 56 is connected t ground potential.

The primary winding of a transformer 60 is connected between the drain terminal of MOSFET 56 and a high-voltage power source connected at point HV. Preferably, a low-pass filter 62 intervenes between the power source at HV and transformer 60 to prevent stray signals from disrupting surrounding circuitry. In addition, an array of diodes 64a, 64b, 64c bridge the primary winding of transformer 60 to clamp the primary voltage when MOSFET 56 is deactivated, and facilitate removal of flux at a faster rate than would be obtained with a single diode. A capacitor 66 also bridges this winding as a phase-correction element that reduces the peak current in the primary circuit.

One end of the secondary winding of transformer 60 is connected to ground potential. A current-limiting resistance 66 is connected between the second end of the secondary winding and the output terminal of the driver circuit, which is connected to an imaging electrode. Preferably, the turns ratio of transformer 60 is 10:1, so that 500 volts across the primary winding (which is within the load capacity of MOSFET 56) produces a peak potential of about 5,000 volts across the secondary winding.

Figure 2:
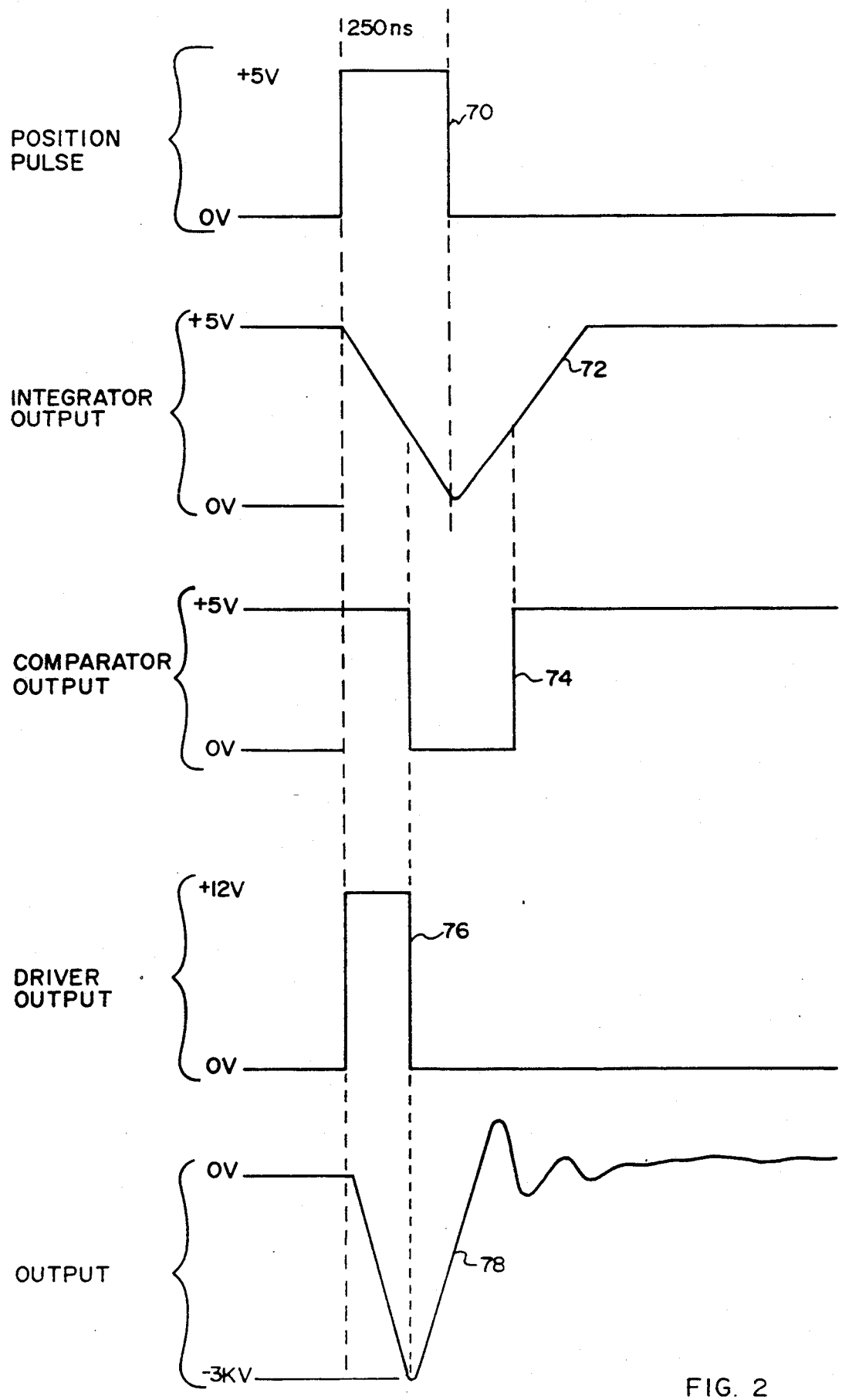
FIG. 2 illustrates a set of waveforms associated with the circuit shown in FIG. 1.

The operation of this driver circuit ma be understood best with reference both to FIGS. 1 and 2, the latter depicting waveforms associated with the circuit. With reference to FIG. 2, when a position pulse 70 (shown for exemplary purposes as a 250 ns, 5-volt signal) is provided to the inverting input of integrator 32, the latter produces a negative-going ramp signal 72. Integrator 32 is preferably configured such that the slope of ramp signal 72 is approximately 20 volts/microsecond. Contemporaneously, the position pulse is provided to an input terminal of AND gate 30b.

Comparator 38 compares the negative-going ramp signal 72 against the fixed reference voltage provided by variable resistor 42 and capacitor 44. When the voltage of signal 72 becomes more negative than the reference voltage, the output of comparator 38 switches to the low state. If, for example, this reference voltage is set at 3 volts, the comparator output signal 74 will drop from the high state to the low state about halfway through position pulse 70.

For the output of AND gate 30b to be high, the output of comparator 38 must be high and the position pulse must be asserted. If these conditions are met, the output of AND gate 30a will go high if a data signal is asserted at its other input terminal. When AND gate 30a goes high, driver 50 is enabled, and the latter provides to the gate of MOSFET 56 a driver signal essentially equal in voltage to $V_2$. Assuming the data signal is asserted, the resulting MOSFET driver signal is shown at reference numeral 76. Thus, this signal goes high with position pulse 70 (assuming, as we are, that the data signal is also asserted), but is driven to the low state when the output of comparator 38 goes low due to the drop in integrator ramp signal 72. This results in the output of driver 50 having a narrower pulse width than that of the enabling position pulse.

The resulting voltage profile is indicated by reference numeral 78. When MOSFET 56 is activated by driver 50, current is drawn through the primary winding of transformer 60. However, the buildup to peak voltage does not occur immediately, but is slowed by capacitance and leakage inductance within the transformer coils. Accordingly, the peak amplitude of the output signal can be controlled by bringing the output of driver 50 low, and thereby deactivating MOSFET 56, before the secondary voltage of transformer 60 has reached its maximum value. This is shown in the waveform of output signal 78, which is permitted to reach −3,000 volts before the flow of current through the primary winding is cut off (resulting in eventual return of the output voltage to zero, after a brief period of low-voltage ringing). Accordingly, the peak output amplitude of the circuit can be controlled by adjustment of the threshold voltage of comparator 38 and thereby controlling the width of the pulse applied to driver 50.

It should be understood that output waveform 78 represents the signal profile produced by the circuit in isolation, i.e., without actual production of a spark discharge. The conductive path produced by dielectric breakdown and ionization results in massive energy transfer and consequent disruption of the signal that would be produced in its absence.

Figure 3:
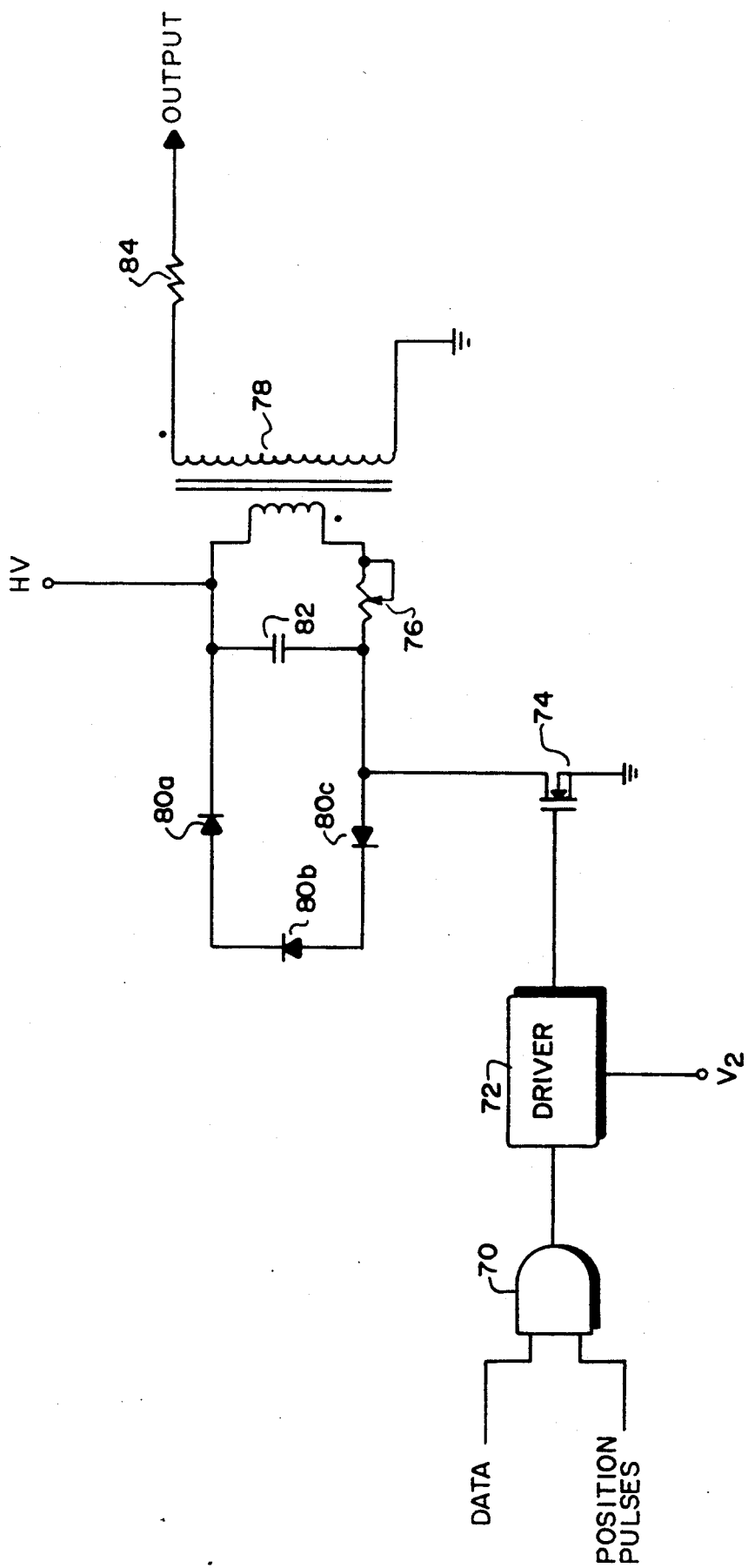
FIG. 3 is a schematic of the second embodiment of the invention, in which the output amplitude is altered by varying the output energy of a MOSFET.

FIG. 3 illustrates the second embodiment of the invention, in which the output amplitude is adjusted directly by means of a variable resistor that limits the output energy of a MOSFET. While simpler than the circuit shown in FIG. 1, it is physically large and does not easily conform to practical packaging constraints; this circuit also requires considerable supply energy to attain useful performance levels.

In this circuit, an AND gate 70 receives as inputs the stream of data and position pulses. Consequently, its output goes high only when the controller indicates location of the electrode adjacent an eligible plate position and a high data signal directs placement of an image spot. The output terminal of AND gate 70 is connected to the input terminal of a high-speed, high-current MOSFET driver 72. Driver 50 receives power from a suitable power source connected at point $V_2$ via a low-pass filter 52 and a capacitor 54. The output terminal of driver 72 is connected to the gate of a MOSFET 74. The source terminal of MOSFET 72 is connected to ground potential, and the drain terminal to a variable resistor 76. Variable resistor 76 is a heavy-duty (e.g., at least 25-watt) device capable of handling the large current levels that will pass through MOSFET 74.

The primary winding of a transformer 78 is connected between the drain terminal of MOSFET 74 and a high-voltage power source connected at point HV. An array of diodes 80a, 80b, 80c bridge the primary winding of transformer 78 to clamp the primary voltage when MOSFET 74 is deactivated, and facilitate removal of flux at a faster rate than would be obtained with a single diode. A capacitor 82 also bridges this winding as a phase-correction element that reduces the peak current in the primary circuit.

One end of a secondary winding of transformer 78 is connected to ground potential. A current-limiting resistance 84 is connected between the second end of the secondary winding and the output terminal of the driver circuit, which is connected to an imaging electrode. Once again, the turns ratio of transformer 78 is preferably 10:1.

Figure 4:
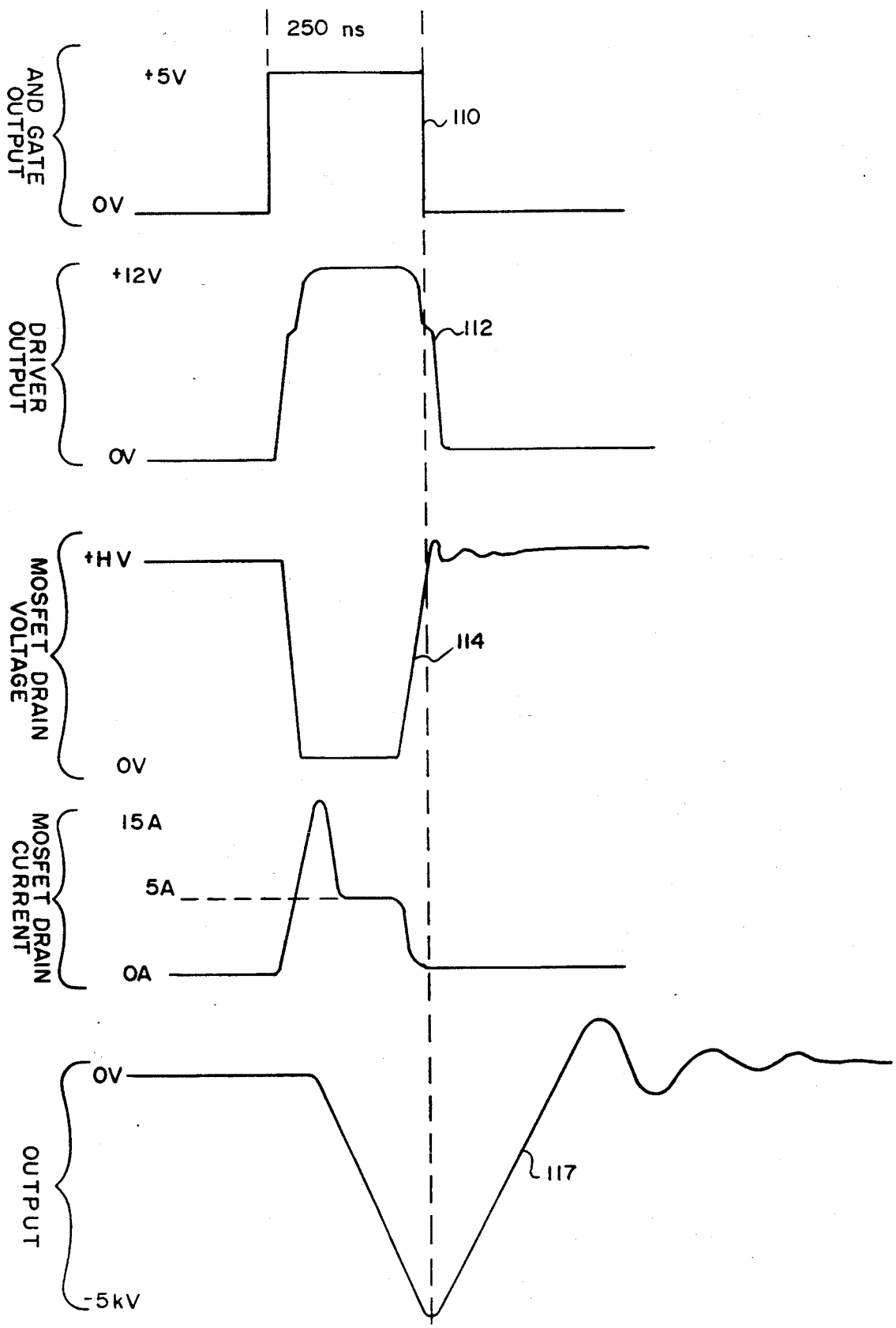
FIG. 4 illustrates a set of waveforms associated with the circuit shown in FIG. 3.

Waveforms associated with this circuit are shown in FIG. 4. The signal 110 is an exemplary output of AND gate 70, which has a duration of 250 ns. In response to this signal, driver 72 produces the signal indicated by reference numeral 112 at the gate of MOSFET 74, activating MOSFET 74 and opening the circuit path from HV through variable resistor 76 to ground. This is shown at signal 114, which illustrates the voltage drop across variable resistor 76 as measured at the drain terminal of MOSFET 74. Variable resistor 76 acts as a voltage divider in conjunction with the impedance presented by the primary winding of transformer 78. By increasing the resistance of variable resistor 76, one reduces the voltage drop across the primary winding, resulting in a smaller change in current level per unit time, and therefore reducing the output voltage of the transformer. Generation and clamping of the output voltage occurs as described above, as shown in the signal indicated by reference numeral 117.

Figure 5:
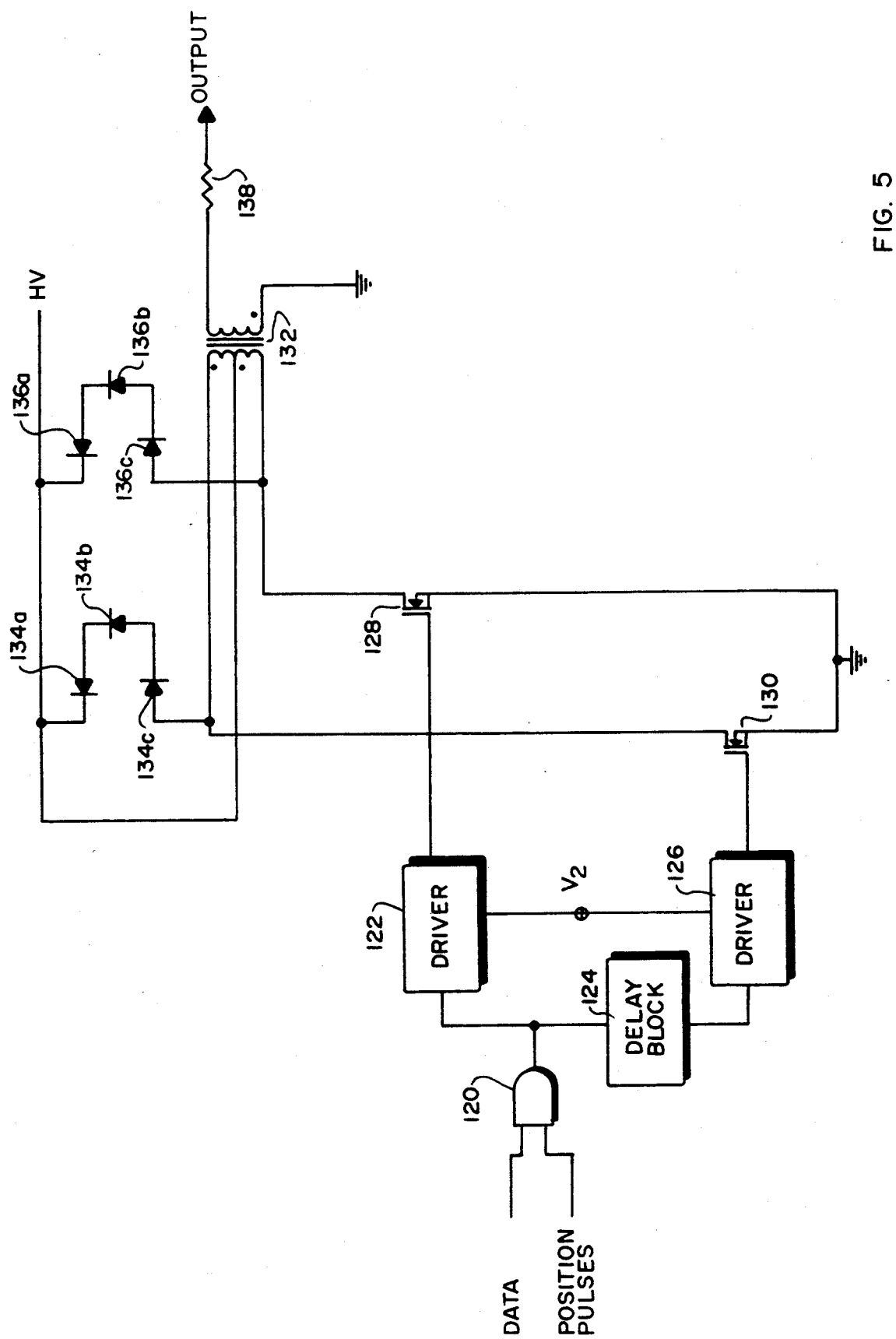
FIG. 5 is a schematic of the third embodiment of the invention, a push-pull design that is capable of producing very small output-pulse widths.

Our third embodiment is shown in FIG. 5. Of all our drivers, this "push-pull" circuit provides the narrowest output pulse. The data and position lines are fed to an AND gate 120, whose output terminal is connected to a MOSFET driver 122 and a delay block 124. The output terminal of delay block 124 is connected to another MOSFET driver 126. Both drivers 122, 126 can be powered by the same source at $V_2$, and each is connected to the gate of a separate MOSFET 128, 130. The source terminals of the MOSFETs 128, 130 are connected to ground potential, and the respective drain terminals to upper and lower halves of the primary winding of transformer 132. Connected between the upper and lower halves of the primary winding is a high-voltage power supply, indicated at HV, whose voltage range is the same as in the previous circuits. HV is also connected to the drain terminals of MOSFETs 128, 130 via series of diodes 134a, 134b, 134c and 136a, 136b, 136c, respectively.

One end of the secondary winding of transformer 132 is connected to ground potential. A current-limiting resistance 138 is connected between the second end of the secondary winding and the output terminal of the driver circuit, which is connected to an imaging electrode. The turns ratio of transformer 78 is preferably 10:1 with respect to each half of the primary winding.

Figure 6:
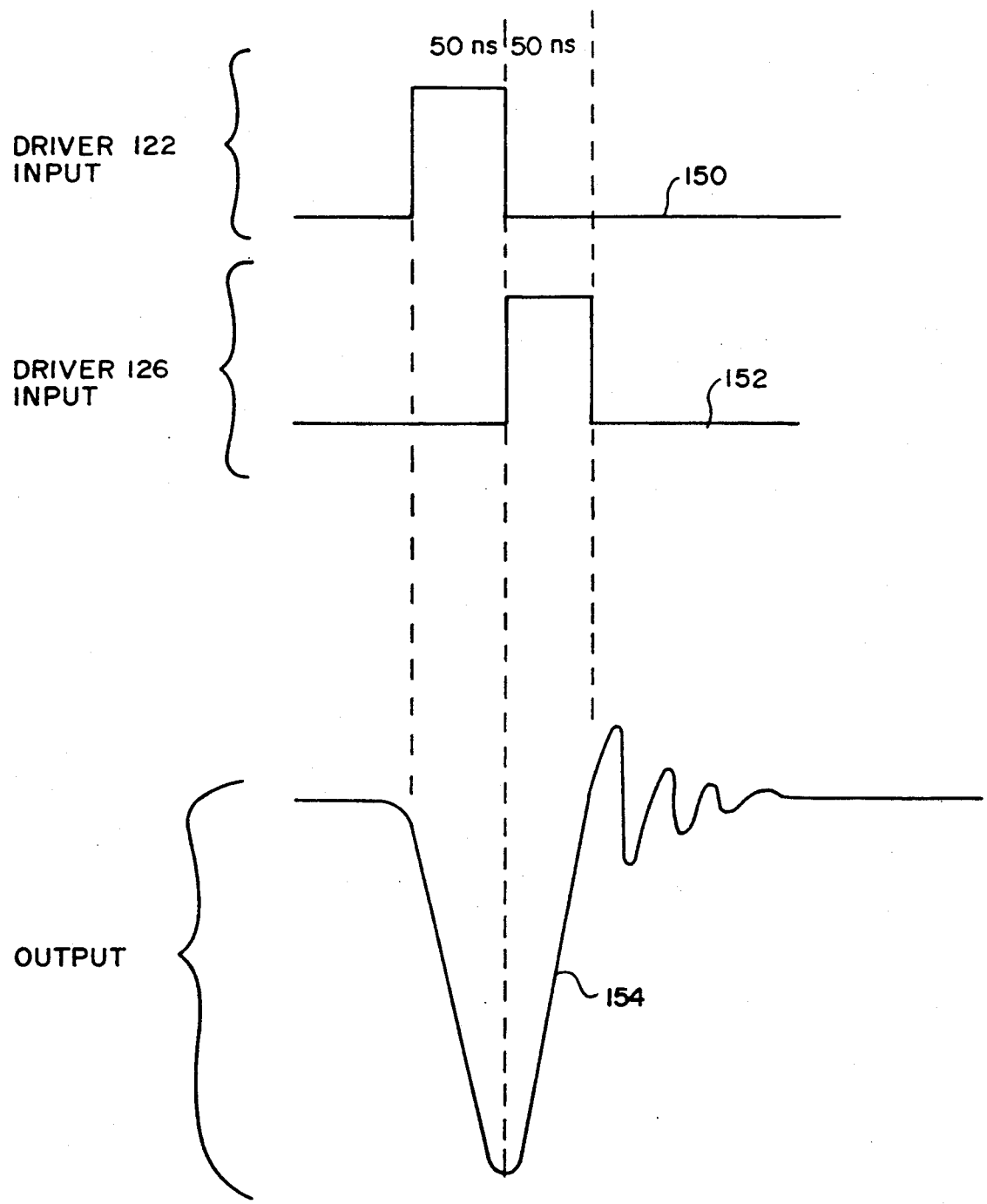
FIG. 6 illustrates a set of waveforms associated with the circuit shown in FIG. 5.

FIG. 6 shows waveforms for this circuit using very short (50 nanosecond) position pulses and a delay time of equal duration. When the data signal and position pulse are both high, the input to driver 122 is brought high but the input of driver 126 kept low. Fifty nanoseconds later, the output of delay block 124 goes high, bringing up the input to driver 126. By this time, the output of driver 122 is low.

The relationship between the signals 150 and 152 and their respective durations determine the contour of the trailing edge of output pulse 154, and also influence the peak amplitude of this pulse.

When driver 122 is enabled, MOSFET 128 is activated, and current flows in the lower half of the primary winding of transformer 132. This induces a voltage across the secondary winding, rapidly driving the output negative as shown by signal 154. When the output of driver 122 is brought low, MOSFET 128 is deactivated and the magnetic flux in the core of transformer 132 begins to collapse. Contemporaneously, the output of driver 126 is brought high, activating MOSFET 130 and causing current to flow in the upper half of the primary winding of transformer 132. This current, which flows in the direction opposite that of the initial energizing current, accelerates the collapse of flux in the core of transformer 132 and rapidly brings the output voltage back to ground potential. The overall result is an output voltage pulse of approximately half the width of a pulse generated by a transformer core that is left to reset by relaxation only.

The duration of signal 150 and the onset of signal 152 together control the profile, and therefore the energy, of output signal 154. If the pulse width of signal 150 and the delay provided by delay block 124 are kept small, the output pulse can be brought back to ground potential before it reaches its maximum value. Preferably, signals 150 and 152 do not overlap, nor are they separated by any significant time gap; failure to time the delay so that signal 152 goes high as signal 150 goes results in a disadvantageous output-signal profile.

Figure 7:
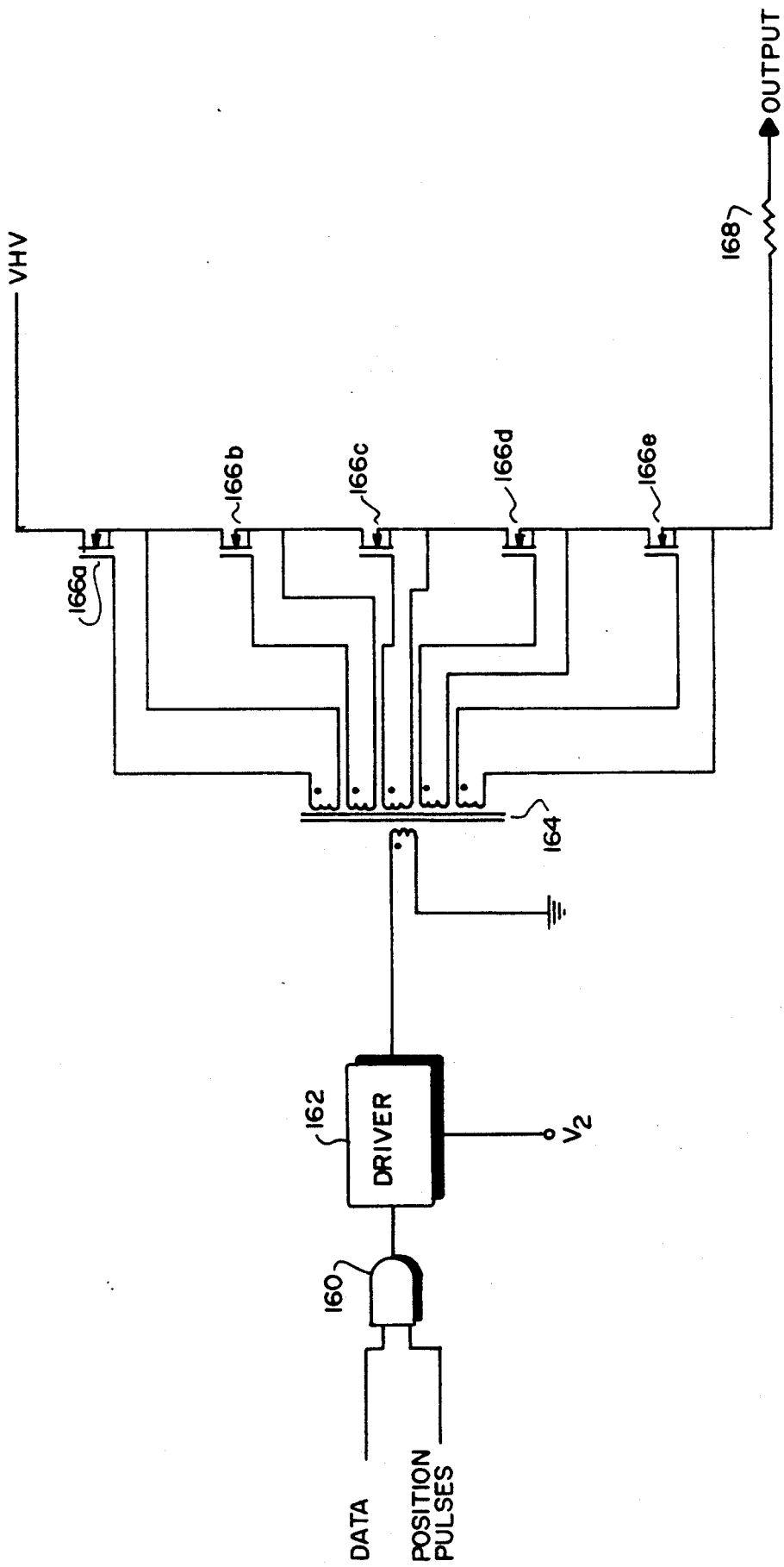
FIG. 7 is a schematic of the fourth embodiment of the invention, which does not require an output transformer.

FIG. 7 shows the fourth embodiment of the invention, a driver circuit that does not utilize an integral output step-up transformer. As shown, it is configured to provide a positive output voltage. The data and position lines are fed to an AND gate 160, whose output terminal is connected to a MOSFET driver 162. The output terminal of MOSFET driver 162 is connected to the primary winding of a transformer 164, which has a turns ratio of $1+1+1+1+1:1$, so that, for example, a 12-volt pulse at a primary winding induces a similar pulse at each secondary winding. Each of these is connected to the gate and source terminals of one of MOSFETs 166a, 166b, 166c, 166d, 166e. The drain terminal of MOSFET 166a is connected to a source of very high voltage equal to the desired output voltage (on the order, for example, of about 2–4,000 volts, the upper limit being dictated by the number of MOSFETs). This source is indicated in the figure by VHV. The drain terminals of each of the remaining MOSFETs is connected to the source terminal of the MOSFET above it. The source terminal of MOSFET 166e is connected, via current-limiting resistor 168, to the output terminal of the driver circuit.

Figure 8:
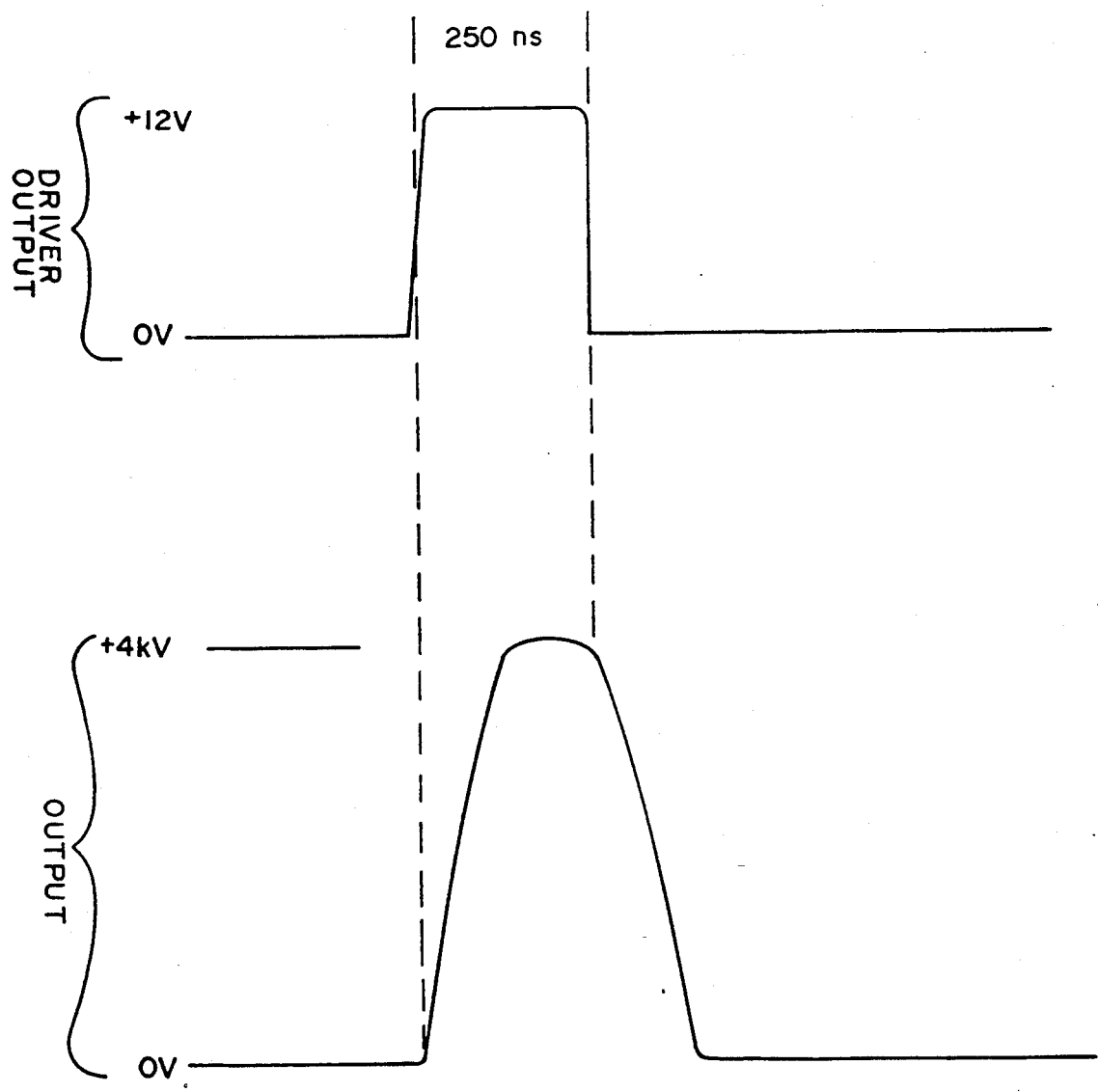
FIG. 8 illustrates a set of waveforms associated with the circuit shown in FIG. 7.

As shown in FIG. 8, when the output of driver 162 goes high (for the duration of the time the data signal and position pulse are asserted, shown as 250 ns in the figure), MOSFETs 166a, 166b, 166c, 166d, 166e are all activated simultaneously, connecting VHV to the output. When the output of driver 162 goes low, deactivating the MOSFETs, driver 162 shunts the primary winding of transformer 164, thereby aiding the collapse of the flux in the core.

It is possible to alter the configuration shown in FIG. 7 to produce a negative-voltage output, by connecting a negative high-voltage power source to the source terminal of MOSFET 166e, and taking the output from the drain terminal of MOSFET 166a.

Figure 9:
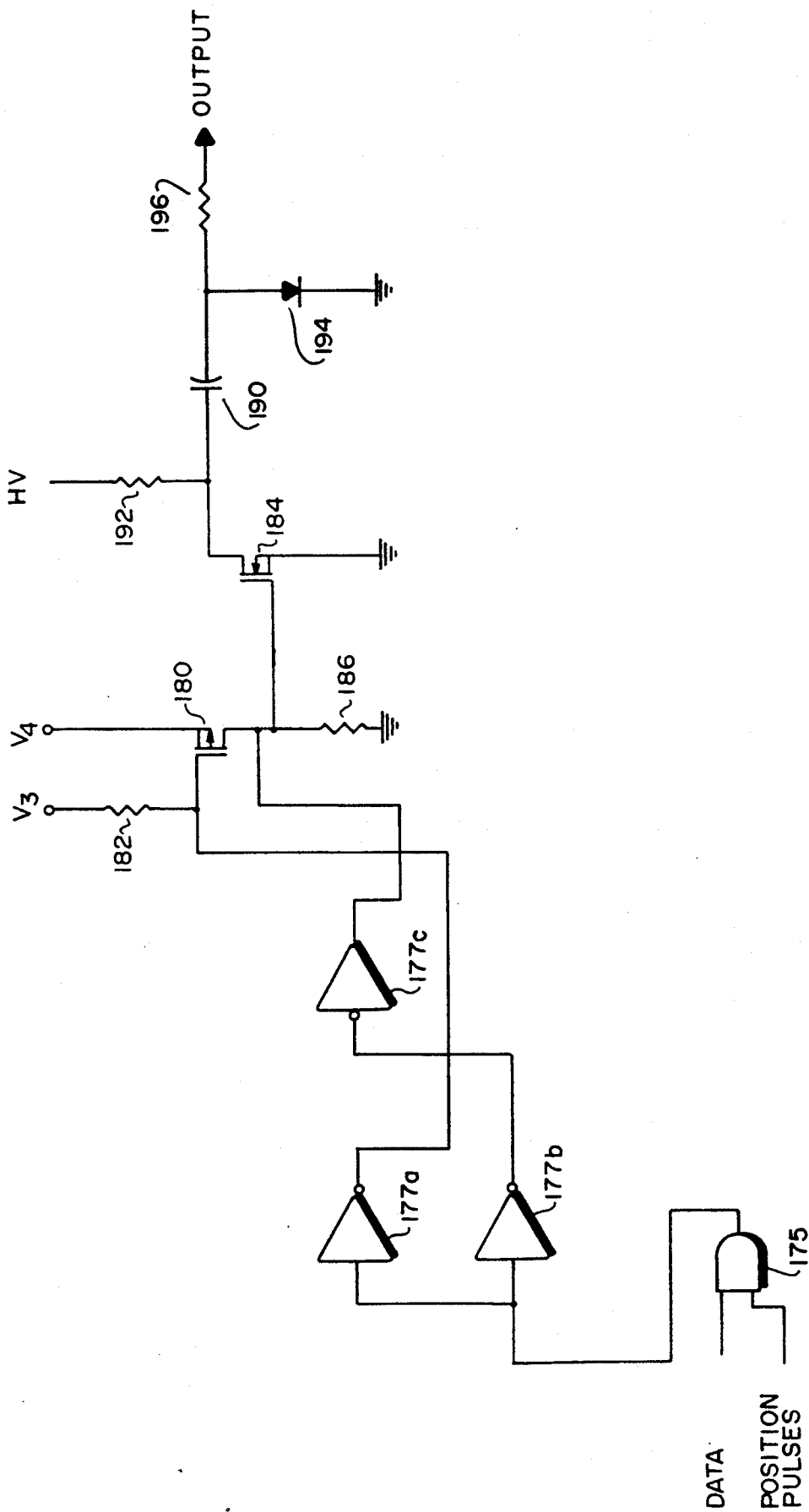
FIG. 9 is a schematic of the fifth embodiment of the invention, which also does not require an output transformer.

A circuit diagram of our fifth embodiment is shown in FIG. 9. This design, which does not require an integral output transformer, utilizes a charging capacitor to deliver the output pulse. The data and position lines are fed to an AND gate 175, whose output terminal is connected to a pair of inverters 177a, 177b, and the output terminal of inverter 177b being connected to a third inverter 177c; alternatively, inverters 177b, 177c can be replaced by a buffer. All of these inverters (or buffer have sufficient current-drive capability to bring the gate terminal of a MOSFET to ground potential. The output terminal of inverter 177a is connected to the gate terminal of a MOSFET 180. Also, a power supply shown at $V_3$ is connected to the gate terminal of MOSFET 180 via a resistor 182, which brings the gate terminal back to the power-supply voltage when inverter 177a becomes inactive. Another power supply, shown at $V_4$, is connected to the source terminal of MOSFET 180. The drain terminal of MOSFET 180 is connected to a second MOSFET 184. Also connected to the source terminal of MOSFET 180 are the output terminal of inverter 177c and a biasing resistor 186, the other end of which is connected to ground potential.

The source terminal of MOSFET 184 is connected to ground potential, and the drain terminal to one end of a relatively high-value capacitor (e.g., 0.01 uF) 190. A high-voltage power source shown at HV is also connected to the same end of capacitor 190 via a resistor 192, which is used to initialize the capacitor charge at the high-voltage value. The potential of power source HV is equal to the desired output voltage. A diode 194 clamps the output pulse from going positive during the post-output recover time of capacitor 190.

Figure 10:
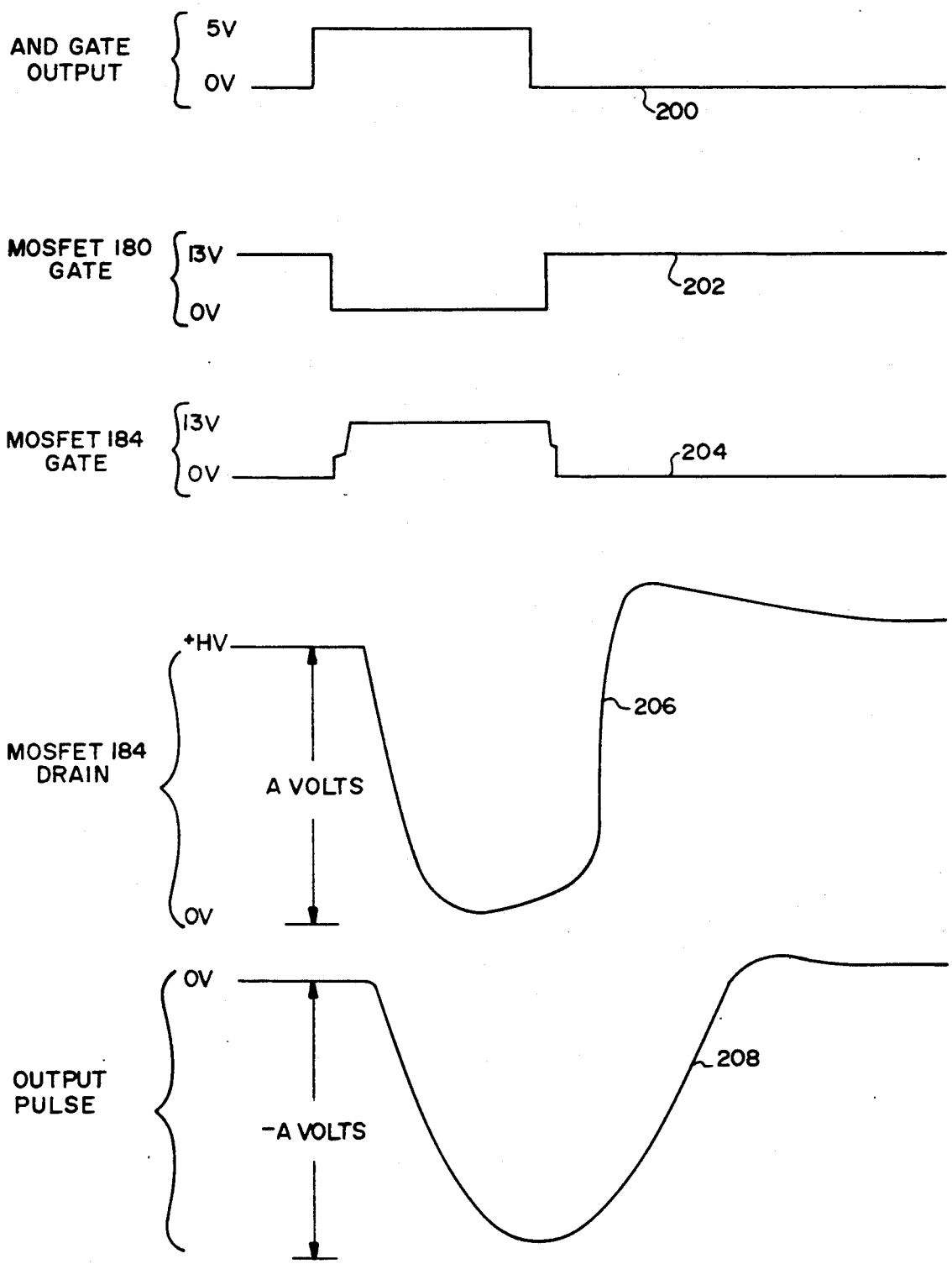
FIG. 10 illustrates a set of waveforms associated with the circuit shown in FIG. 9.

FIG. 10 shows waveforms for this circuit. When MOSFET 184 is deactivated, power source HV charges capacitor 190 to a potential equal to HV, shown in FIG. 10 as A volts. When the output 200 of AND gate 175 goes high, inverter 177a brings the gate terminal of MOSFET 180 low, thus activating the MOSFET; this is illustrated by signal 202, which represents the voltage levels of the gate of MOSFET 180. When MOSFET 180 is activated, the low voltage at its drain terminal brings the gate terminal of MOSFET 184 high, thus activating this MOSFET. Because capacitor 190 has been fully charged, operation of MOSFET 184 brings to ground potential the end of capacitor 190 connected to the drain terminal of MOSFET 184, as shown in signal 206. This forces the other end of capacitor 190 to become negative with respect to ground by the value of voltage HV (shown as A), thus producing the output voltage profile shown by signal 208.

When the output of AND gate 175 goes low, the drain terminal of MOSFET 180 is brought to ground, thereby deactivating the device. This results in charging of one side of capacitor 190 to the HV voltage level, pulling the other side (facing the output pulse) back toward ground potential.

This design operate rapidly and is capable of generating a negative-voltage output pulse from a positive-voltage power supply. However, the output-pulse voltage is limited by the breakdown-voltage rating of the output-power MOSFET 184.

Figure 11:
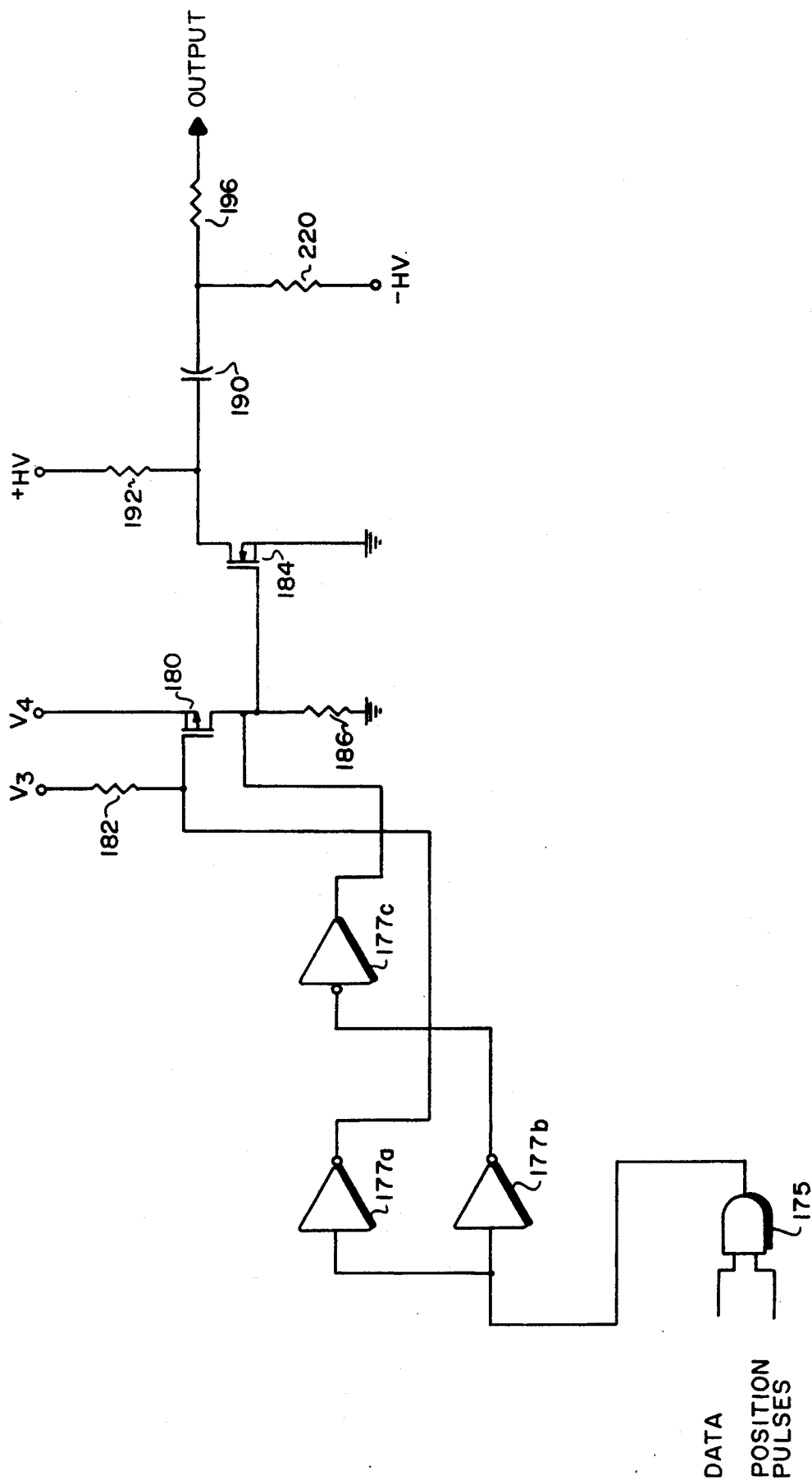
FIG. 11 is a schematic of the sixth embodiment of the invention, which is a biased-capacitor version of the circuit shown in FIG. 9.
Figure 12:
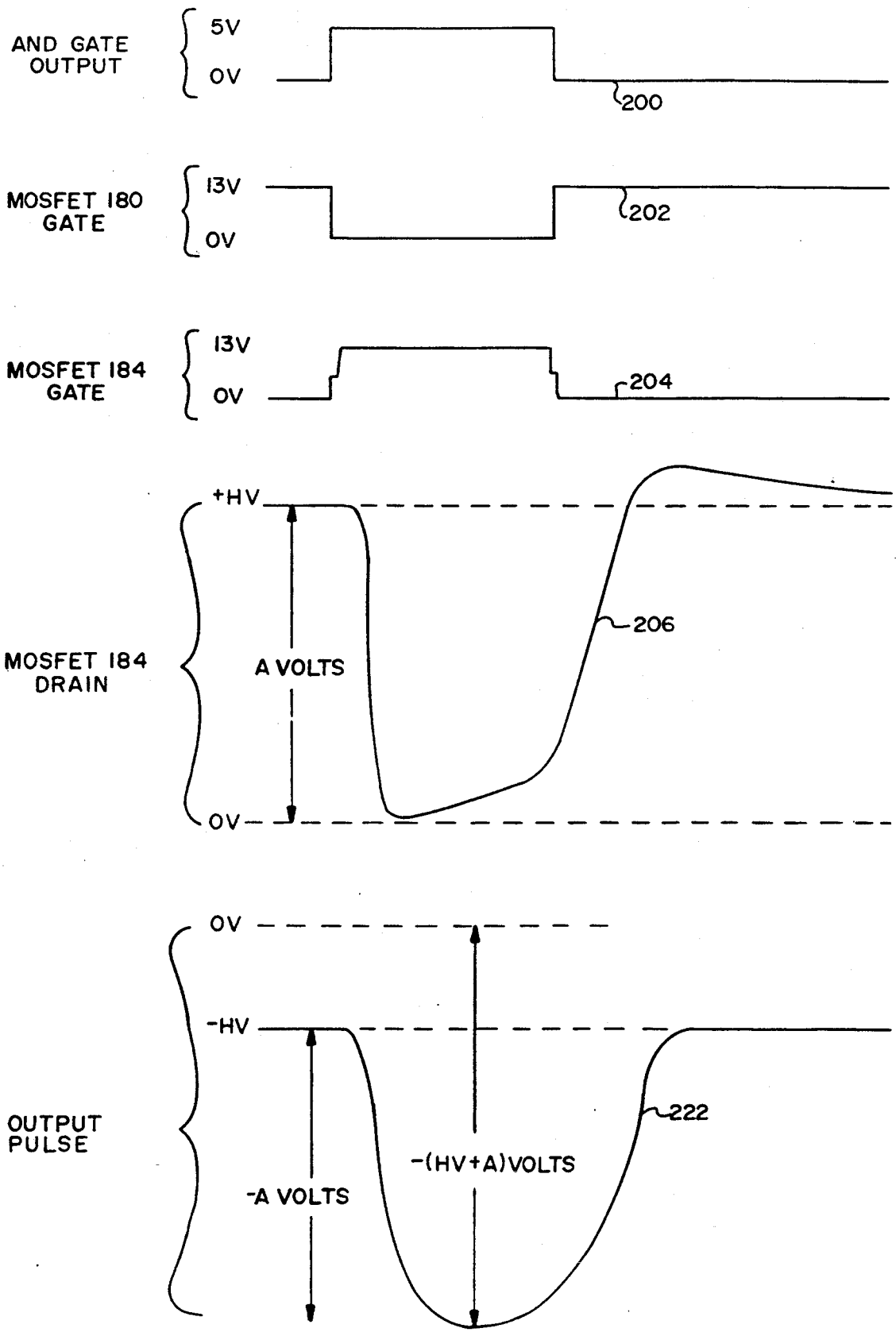
FIG. 12 illustrates a set of waveforms associated with the circuit shown in FIG. 11.

FIG. 11 illustrates a variation of the circuit shown in FIG. 9, in which the voltage across capacitor 190 is biased to facilitate greater output levels. As shown in the figure, a negative-voltage power supply $-HV'$ is connected to the output side of capacitor 190 via resistor 220, which is used to initialize capacitor 190 and bias the output pulse. As shown by signal 222 in FIG. 12, this boosts the output pulse to an augmented negative level equal to $-HV' - HV$. Thus, this design overcomes the output voltage limitation associated with the previous design; however, the bias voltage $-HV'$ cannot be so large as to cause either spontaneous arcing or unduly long persistence of the arc condition after shutoff. Accordingly, the designs shown in FIGS. 9 and 11 are particularly useful with our plasma-jet designs described in the above-referenced '089 and PCT applications.

Figures 13A, 13B:
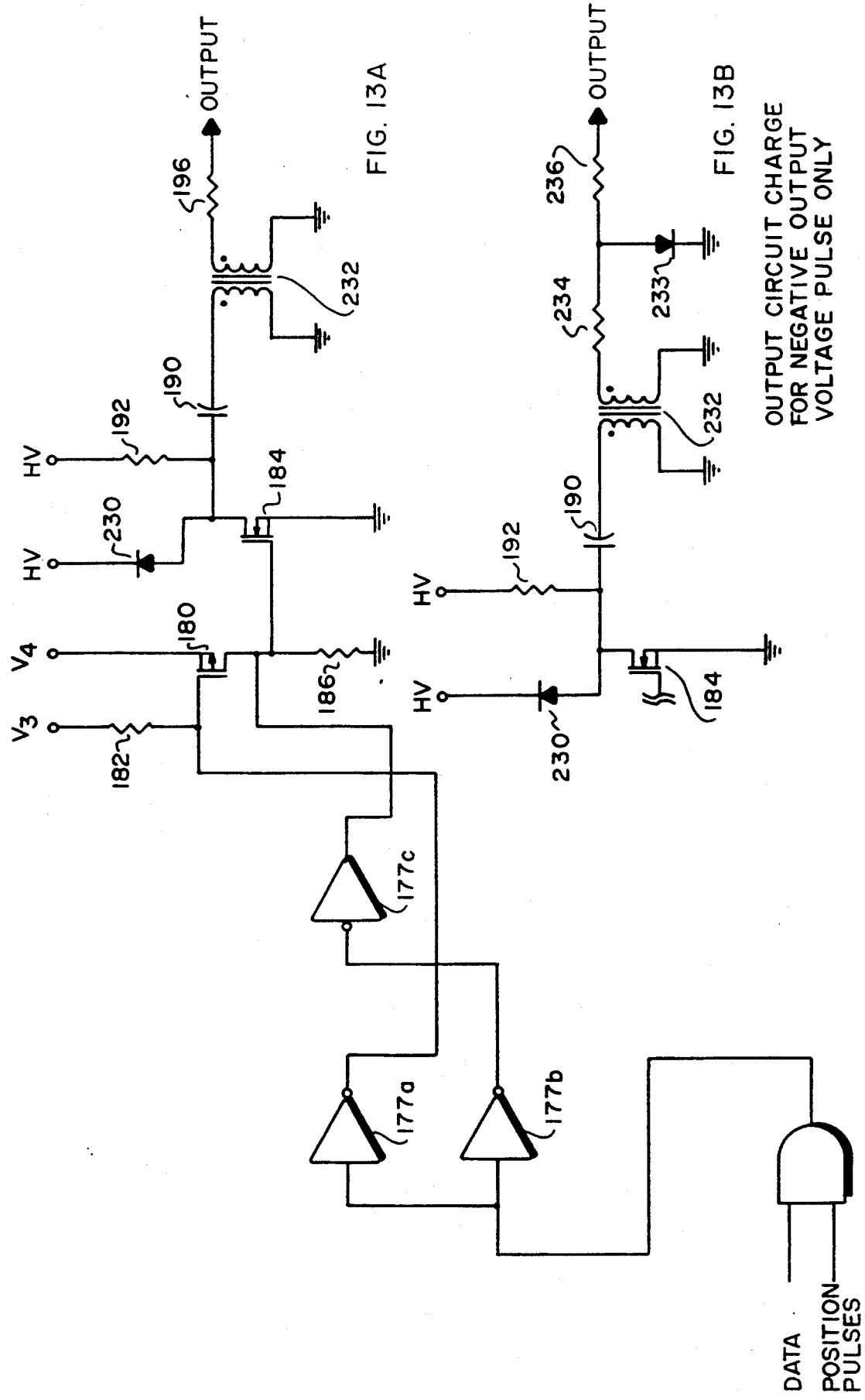
FIGS. 13A and 13B are a schematics of the seventh embodiment of the invention, which is a variation of the circuit shown in FIG. 9.
Figure 14:
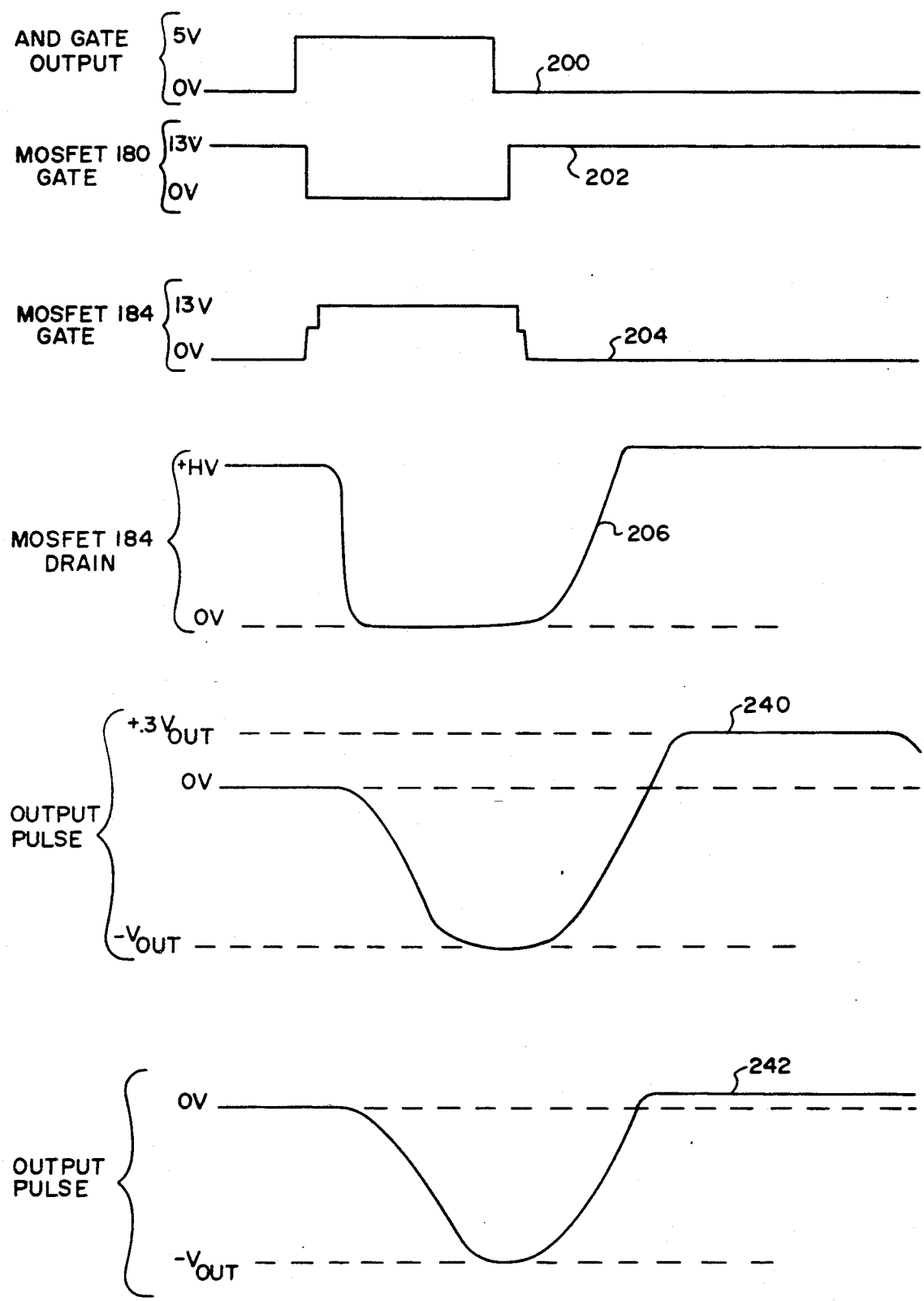
FIG. 14 illustrates a set of waveforms associated with the circuit shown in FIG. 13.

FIG. 13A illustrates another variation on the circuit shown in FIG. 9, this embodiment including an output transformer to boost the maximum output voltage. In this circuit, the anode of a diode 230 is connected to the drain terminal of MOSFET 184, and the cathode to the HV power supply. A primary winding of a step-up transformer 232 is connected to the output side of capacitor 190, and a secondary winding to current limiting resistor 196. Transformer 232 increases the output voltage from HV to a larger desired level, $V_{out}$. Diode 230 prevents transformer 232 from raising the voltage on the drain terminal of MOSFET 184 above the level of power supply HV. As shown in the output signal indicated by reference numeral 240 in FIG. 14, the output pulse of this circuit drops to the negative peak level $V_{out}$ produced at the output of transformer 232, and then rises above zero to a level approximately equal to 30% of the absolute value of $V_{out}$ upon deactivation of MOSFET 184.

FIG. 13B illustrates an improvement that may be made to the circuit shown in FIG. 13A. The anode of a diode 233 is connected between two resistances 234, 236 connected in series; together, these perform the same function as current-limiting resistance 196. This diode prevents the output pulse from rising above a small positive voltage upon deactivation of MOSFET 184, as shown in the output signal at reference numeral 240 in FIG. 14

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

We claim:

1. An electrode driver apparatus for use in a spark discharge imaging system including a lithographic plate and an imaging device that comprises an electrode, said apparatus comprising:
   a. spark-discharge enabling means, said means having a first input for receiving imaging data, a second input for receiving a control signal, and an output, said enabling means transmitting a spark-initiation signal in response to the coincidence of said imaging data and control signal;
   b. spark-discharge generating means, including a transformer having a primary winding connected to a supply voltage and a switch, said switch being responsive to the spark-initiation signal to apply the supply voltage to the primary winding, and a secondary winding coupled to an electrode; and
   c. means, coupled to the secondary winding, for controllably limiting the current carried through the secondary winding and for limiting the voltage applied to the electrode to a single polarity.

2. The apparatus of claim 1 further comprising means for varying the amplitude of the voltage applied to the electrode.

3. The apparatus of claim 2 wherein the amplitude-control means comprises means for terminating the application of the supply voltage to the primary winding of the transformer prior to attainment of peak output from the secondary winding.

4. The apparatus of claim 2 wherein the amplitude-control means comprises a voltage divider that selectably changes the output energy of the transformer.

5. The apparatus of claim 1 further comprising means for deactivating the spark-initiation signal and for accelerating the collapse of flux in the core of the transformer upon termination of the spark-initiation signal.

6. An electrode driver apparatus for use in a spark-discharge imaging system including a lithographic plate and an imaging device that comprises an electrode, said apparatus comprising:
   a. spark-discharge enabling means, said means having a first input for receiving imaging data, a second input for receiving a control signal, and an output, said enabling means transmitting a spark-initiation signal in response to the coincidence of said imaging data and control signal;
   b. spark-discharge generating means, including a high-voltage source connected to a switch, said switch being responsive to the spark-initiation signal to apply the high voltage to an electrode; and
   c. means for deactivating the switching means and rapidly bringing the electrode to ground potential upon termination of the spark-initiation signal.

7. The apparatus of claim 6 further comprising a charging capacitor interposed between the high-voltage source and the electrode, which is discharged to the electrode upon activation of the switch.

8. The apparatus of claim 7 further comprising a second voltage source, of polarity opposite to that of the high-voltage source, interposed between the capacitor and the electrode, the second voltage source augmenting the amplitude of the signal applied to the electrode.

9. The apparatus of claim 7 further comprising a transformer to augment the amplitude of the signal applied to the electrode.

* * * * *